March 1, 1966 W. L. DOLLENMAYER 3,237,952

PORTABLE DICTATING MACHINE

Filed Dec. 20, 1963 2 Sheets-Sheet 1

INVENTOR.
WILLIAM L. DOLLENMAYER

BY Paul D. Carmichael

ATTORNEY.

March 1, 1966 W. L. DOLLENMAYER 3,237,952

PORTABLE DICTATING MACHINE

Filed Dec. 20, 1963 2 Sheets-Sheet 2

United States Patent Office 3,237,952
Patented Mar. 1, 1966

3,237,952
PORTABLE DICTATING MACHINE

William L. Dollenmayer, Lexington, Ky., assignor to International Business Machines Corporation, New York, N.Y., a corporation of New York Filed Dec. 20, 1963, Ser. No. 332,174
20 Claims. (Cl. 274—17)

The present invention relates generally to the dictation art and more particularly to the provision of improved apparatus for guiding a record medium in a path of travel past a transducer and which greatly facilitates loading and removal of the record medium.

In recent years, much effort has been expended in the development of portable miniaturized dictating machines. Dictating machines which are battery operated, light weight and compact whereby they are easily held and portable find a ready market, such as recording dictation when walking or traveling. Cylindrical belts of record material are the record media most commonly employed in office type dictating equipment. It is highly desirable that a portable dictating machine use the same general type and size of belts as office type dictating equipment since the recording capacity of the portable machine is then approximately the same as that employed and found highly satisfactory in office dictating machines. If the size of the record belt is substantially reduced, frequent changing of the belts is required. The use of the same type and size of record belts also eliminates the need for special transcribing apparatus since the record belts can be transcribed using the office type dictation transcribing equipment which is usually already available to the dictator.

While the advantages of a small portable dictating machine employing a standard type and size of record belt have long been recognized, prior art portable dictating machines have either used a different record medium, such as magnetic tape, or are characterized by the complicated and time consuming operations necessary to change belts. The reason for this is that the record belts are relatively large and, to conserve space, must be loaded for movement in complicated paths of travel. For example, the record belt used in one commercially available office type dictating machine may be approximately three to four inches wide and have a circumference of over twelve inches and is itself about the desired size of a portable dictating machine. The record belt must be properly tensioned for driving movement past the transducer during dictation operations and this requirement has further complicated the loading and unloading operations.

Briefly, the present invention is directed to a dictating machine or the like employing a record belt as the record medium. A housing mounts a rotatable drive roll or capstan and at least one guide surface which is movable from a closed or retracted belt loaded position within the housing adjacent to a plane of the axis of the drive roll to an extended or open belt loading position outwardly of the housing and spaced an appreciable distance from the above mentioned plane of the axis of the drive roll. When the guide surface is in the extended or open position, a record belt is loosely received thereover but when the guide surface is in the retracted or closed position, the record belt is properly tensioned and conforms to a complicated path of record belt travel. Slit-like openings or slots in the housing permit easy changing of the record belt when the guide surface is in the open or extended position. At least one pivoted cover on the housing is operative to move the guide surface to the retracted position as the cover is closed. In the illustrated embodiment of the invention, there are two movable guide surfaces defined by guide rolls mounted for pivotal swinging movement by a pair of support arm structures. Auxiliary guide rolls are also provided in the housing to assist in guiding the record belt in its path of travel.

It is the primary or ultimate object of the invention to provide a portable dictating machine having improved apparatus for guiding a record belt in a path of travel past a transducer wherein changing of the record belts is easily and readily accomplished. A pair of guide rolls are movable between retracted or closed and extended or open positions. When the guide rolls are in the extended position, the record belt is loosely received thereover but when the guide rolls are in the retracted position, the belt is properly tensioned and positioned in transducing relation with respect to a transducer. The tensioning of the belt occurs automatically when the guide rolls move to the retracted position due to the geometry of the structure and the provision of an auxiliary yieldably biased guide roll.

Another object of the invention is the provision of a portable dictating machine or the like wherein the record belt is caused to move in a path of travel which occupies a minimum of space within the housing. The arrangement is such that the overall size of the portable dictating machine is kept at a minimum but a standard record belt having an acceptable recording capacity is employed. The path of travel is arranged so that sufficient mounting area is provided for all functional units of the dictation machine but yet the record belt is readily exposed and easily accessible for changing the same.

Yet another object of the invention is to provide a portable dictating machine having a pair of pivoted side covers which when opened result in the record belt assuming an untensioned position for removal and which, when closed, cause tensioning of the record belt. Closing of the covers causes the record belt to move from a normal generally cylindrical orientation and conform to a complicated path of travel used in effecting relative movement between the record belt and the transducer.

A further object of the invention is to provide a portable dictating machine or the like wherein the path of travel for the record belt is so designed that the portion of the record belt disposed beneath the transducer is effectively isolated from vibrations from the belt drive means. The distance between the drive means and the transducer measured along the belt is equal to approximately the length of the belt itself and a spring biased guide roll for the belt is disposed between the motor and the transducer for dampening vibrations.

A still further object of the invention is the provision of a portable dictating machine having the characteristics set forth above which is extremely compact and of simplified construction whereby the same may be manufactured at a low cost but yet is very rugged and highly reliable in operation.

The foregoing and other objects, features and advantages of the invention will be apparent from the following more particular description of a preferred embodiment of the invention, as illustrated in the accompanying drawing:

Figure 1:
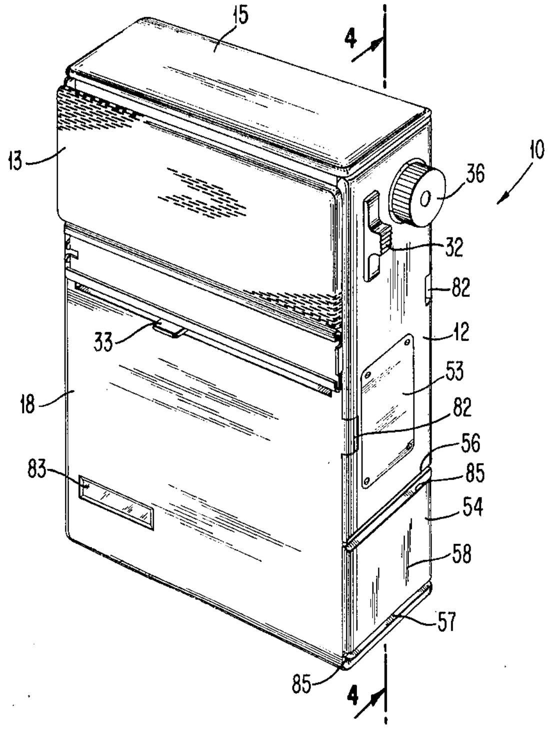
FIGURE 1 is a side perspective view of a portable dictating machine constructed in accordance with and embodying the teachings of the present invention.

Referring now to the drawings, and initially to FIGURES 1–4 thereof, there is shown a portable dictating machine constructed and operated in accordance with the teachings of this invention. The portable dictating machine comprises a rectangular housing generally designated by the reference numeral 10 having a pair of end walls 11 and 12, a pair of side walls 13 and 14, a top wall 15, and a bottom wall 16. The side walls 13 and 14 extend downwardly from the top wall 15 for a relatively short distance and large openings 17 are provided on opposite sides of the housing.

Pivoted to the bottom wall 16 of the housing are a pair of generally rectangular covers 18 and 19 which are adapted to close the side openings 17. As will be hereinafter more fully explained, the covers 18 and 19 perform important functions during changing of a record belt. When the covers 18 and 19 are in their open or extended positions, the major portion of the interior of the housing is exposed and components mounted therein are readily accessible.

The interior of the housing 10 is divided into an upper area 20 and a lower area 21. The upper area 20 provides mounting space for the major electronic components of the dictating machine, such as a combined microphone and loudspeaker 22 and an amplifier 23. These electronic components in and of themselves form no part of the present invention and, since their construction and operation is well known in the electronic and dictating arts, they will not be further described.

The lower area 21 is considerably larger than the upper area 20 and defines space for receiving a transducer 25, a record belt 26 with its associated supporting and guiding structure that will be further described, and a source of energy represented by battery 27. The transducer 25 is mounted from a carrier 29 which is slideably supported on a pair of transversely extending guide rods 30. The carrier 29 has a selective driving connection with an elongated and transversely extending lead screw 31. The lead screw 31 is adapted to be rotated by drive means to advance the transducer 25 and the carrier 29 in a recording direction transversely with respect to the record belt 26. Backspacing apparatus, not particularly shown, is provided and this apparatus, under the control of a three position record-listen-backspace button 32, is operative to incrementally move the transducer and carrier in the backspace direction so that the dictator may review previously recorded dictation. An extension 33 connected with the carrier projects outwardly from the front of the housing and provides a visual indication to the dictator of the position of transducer 25. This extension 33 also defines a manual means for disengaging the carrier 29 and the transducer 25 from the lead screw 31 and moving these parts transversely to a desired position.

The record belt 26 has a generally cylindrical shape in its unloaded state and, when loaded in the dictating machine, is caused to move in a relatively complicated double U-shaped path of travel indicated by arrows 35. The transducer 25 is disposed in closely adjacent transducing relation with respect to the path of travel of the record belt 26. When dictation is to be recorded, the dictator depresses a combination push-to-talk and volume control button 36 located on the side of the housing. The signals to be recorded are supplied from the amplifier 23 to the transducer 25 and lead screw 31 is rotated to advance the carrier and transducer while the record belt 26 moves in its path of travel. A helical recording pattern is formed on the record belt. In the preferred embodiment of the invention, the transducer 25 is a magnetic read-write head and the record belt 26 takes the form of a loop of thin flexible plastic having a layer of magnetizable material on the outer surface thereof. However, it should be understood at the outset that the teachings of the present invention, in their broader aspects, are not limited to the use of any particular type of record belt. The record belt may be of the type which has grooves cut therein as recording proceeds and, in this event, the transducer would have a stylus which engages the record belt and forms the grooves.

Guiding the record belt 26 in its generally double U-shaped path of travel is a large diameter drive roll or capstan 38 and four smaller guide rolls 39–42 whose mounting and operation will be hereinafter further described. The drive roll 38 is located approximately in the middle of the lower area 21 of the housing and spans the end walls 11 and 12. As most clearly shown in FIGURE 4 of the drawings, annular bearings 43 journal the opposite ends of the drive roll. This roll is hollow and mounted within the interior thereof is a small direct current electric motor 44 which is operative to drive a shaft 45 via governor and speed reducing mechanisms 46 and 47. The shaft 45 is connected to the drive roll 38 and mounts a drive gear 48. Gear 48 meshes with a pinion gear 49 which in turn drives a large diameter gear 50 attached to the end of lead screw 31. When the electric motor 44 is energized, the drive roll 38 is rotated to move the record belt 26 in its double U-shaped path of travel and the lead screw 31 is driven to advance the transducer 25 across the record belt.

The gears 48–50 are received within a rectangular recess 52 formed in the end wall 12. The recess 52 is closed by a removable cover plate 53 and in this manner the gearing is effectively protected from dust and lint. This is particularly advantageous since the reduction required between the drive roll 38 and lead screw 31 is substantial and gears of relatively large pitch must be employed. Also, the mounting of the gearing within the end wall 12 allows the portable dictating machine to have a width dimension approximately the same as the width of the record belt 26.

Energy for driving the motor 44 is supplied by battery 27 which are received in axially aligned relation in a generally tubular battery casing 54. The battery casing 54 is rigidly attached to the end wall 11 within the lower area 21 of the housing 10 directly below the drive roll 38 and extends transversely across the lower area 21 in cantilever fashion. The cantilever mounting of the battery casing 54 allows vertically spaced slots 56 and 57 to be provided in the end wall 12 which permit endwise insertion and removal of record belts as will be hereinafter more fully explained. The outer free end portion of the battery casing forms a portion of the end wall 12 of the housing. A snap-on type cover 58 closes the outer free end of the battery casing 54 and is easily removed to facilitate replacement of the battery 27. Suitable magnetic shielding and mechanical dampening materials are employed in the construction of the drive roll 38 and the drive means for effectively isolating the record belt from stray magnetic fields and mechanical vibrations.

The guide rolls 39 and 40 extend across the lower area 21 of the housing and serve to guide the record belt 26 for a portion of its double U-shaped path of travel. A roll mounting rod 60 spans and is rigidly attached to the end walls of the battery casing 54. The elongated guide roll 39 is journalled for rotation on the rods 60. A roll carrier 61 is provided and, as most clearly shown in FIGURE 5 of the drawings, it has laterally projecting tabs 62 which define a pair of oppositely directed clevises 63 and 64. The tabs 62 forming the clevis 64 are spanned by a roll mounting rod 65 which rotatably supports guide roll 40. The pair of tabs 62 forming the clevis 63 are spanned by the roll mounting rod 60 which is rigidly attached to the opposite ends of the battery casing. The arrangement is such that the roll carrier 61 and the guide roll 40 are mounted for limited pivotal movement about a pivot axis defined by the roll mounting rod 60.

The guide rolls 39 and 40 and the roll carrier 61 are mounted in the lower area 21 of the housing directly below the tubular battery casing 54. Disposed between the battery casing 54 and the roll carrier 61 is a leaf spring 66 which exerts a biasing force tending to pivot the carrier 61 and the guide roll 40 downwardly in a counterclockwise direction. The periphery of the guide roll 39 is disposed directly above the bottom slot 57 in the housing while the guide roll 40 may be pivoted from a position in blocking relation with respect to the slot 57 to a position above the transverse plane of this slot.

Figure 2:
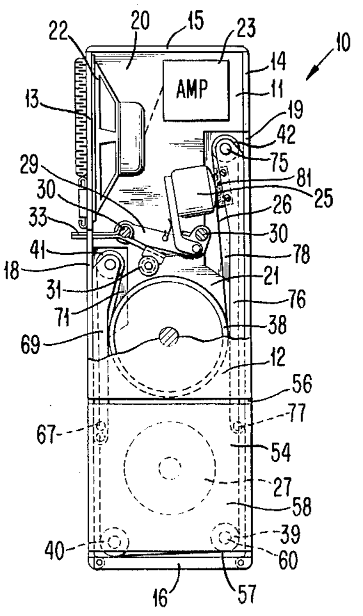
FIGURE 2 is an end view of the portable dictating machine illustrating the record belt in a loaded condition ready to receive dictation.
Figure 3:
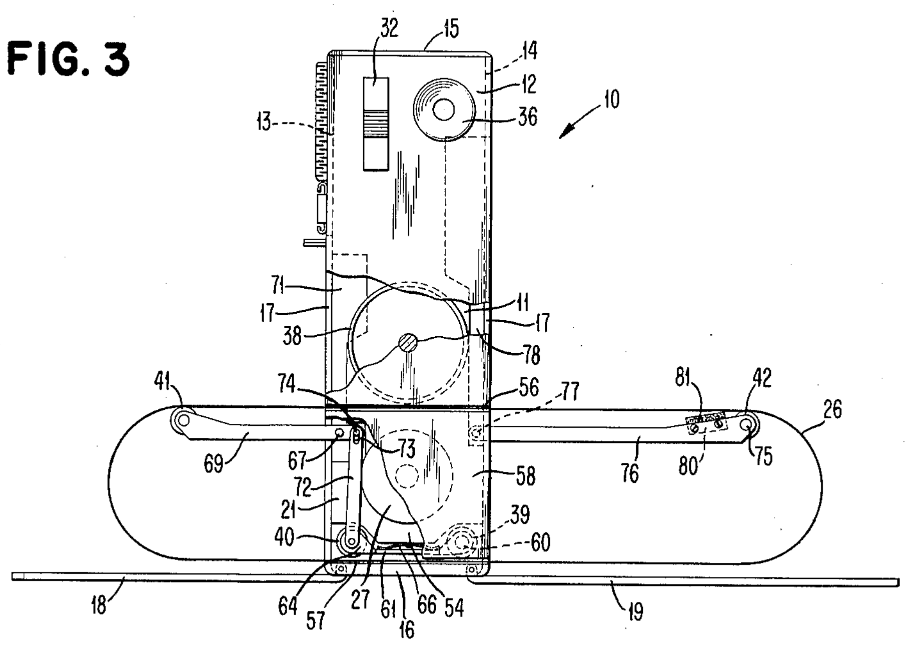
FIGURE 3 is an end view similar to FIGURE 2 showing the portable dictating machine in a condition for a change of record belt.
Figures 4, 6:
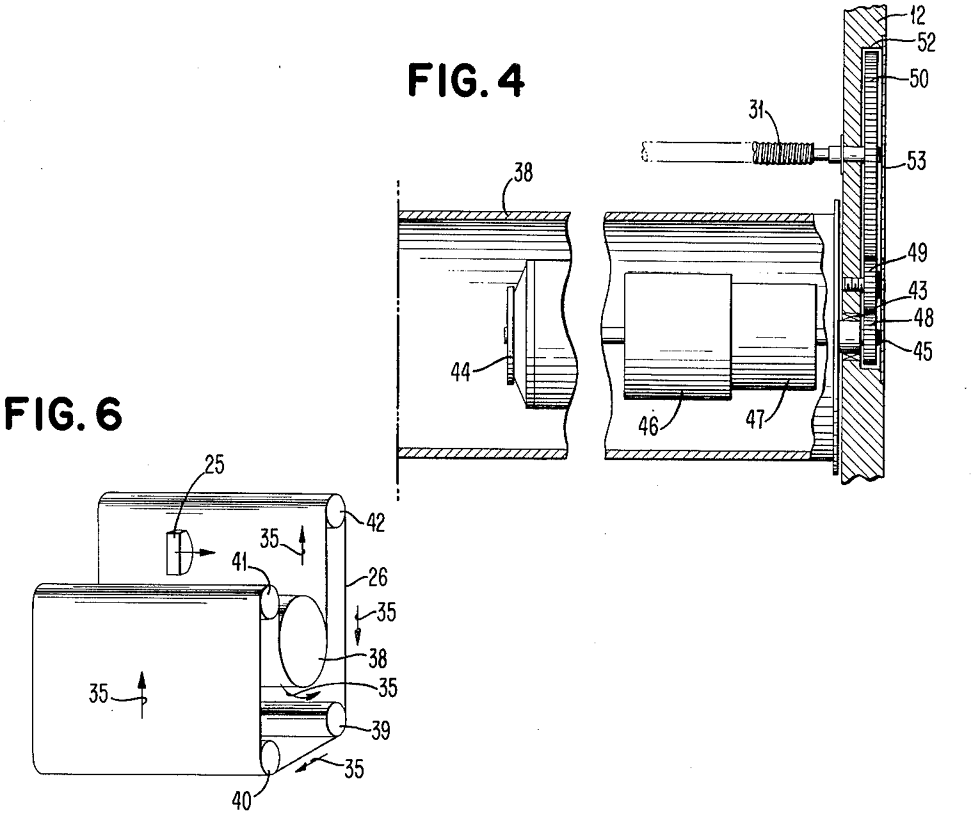
FIGURE 4 is a fragmentary side sectional view taken along the section line 4—4 of FIGURE 1 depicting particularly the drive means employed for moving the record belt and the transducer.
FIGURE 6 is a side perspective view illustrating particularly the path of travel of the record belt with respect to the transducer.

Pivoted to the opposite ends of the battery casing 54 by a pivot pin 67 are a pair of elongated and transversely spaced support arms 69. The outer ends of these arms are spanned by a roll mounting rod 70 which serves as a support for guide roll 41. The support arms 69 are nestingly received in recesses 71 formed in the inner facing sides of the end walls 11 and 12. It should be noted that the guide roll 41 is movable from a closed or retracted belt loaded position completely within the confines of the housing above the upper slot 56 as shown in FIGURE 2 of the drawings to an open or extended belt loading position below the slot 56 as depicted in FIGURE 3 of the drawings. An upwardly extending operating lever 72 is connected to one of the tabs 62 defining the mounting clevis 64 for guide roll 40. This lever 72 has a slot 73 in the upper end thereof which receives the end of a pin 74 carried at the lower end of one of the support arms 69. The arrangement is such that the roll carrier 61 and the guide roll 40 are pivoted upwardly against the action of leaf spring 66 to clear the bottom slot 57 as the guide roll 41 is swung outwardly to its open or extended belt loading position.

The guide roll 42 is journalled on a roll mounting rod 75 which spans the ends of a pair of elongated and transversely spaced support arms 76. These arms are pivotally mounted at their inner ends by a pivot pin 77 to the opposite sides of the battery casing 54. When the support arms 76 are in the retracted or belt loaded position, they are nestingly received in recesses 78 formed in the inner facing surfaces of the end wall 11 and 12 of the housing. At this time, the guide roll 42 is disposed above the upper slot 56 as is shown in FIGURE 2 of the drawings. The guide roll 42 is movable to a belt loading position as shown in FIGURE 3 of the drawings where it is positioned below the transverse plane of the upper slot 56.

Spanning the support arms 76 between the pivot pin 77 and the guide roll 42 is a transverse member 80 which supports a transversely extending pressure pad 81 of felt or other similar soft, compliant material. In the belt loaded position of the guide roll 42, the pressure pad 81 engages the inner surface of the record belt 26 at a point adjacent the transducer 25. The record belt 26 is lightly clamped between the pressure pad 81 and the transducer 25 which insures the belt and the transducer are in proper transducing relation during dictating operations.

As previously noted, the side covers 18 and 19 of the portable dictating machine are pivoted to the bottom wall 16 of the housing. These covers are mounted for inward and outward swinging movement when changing a record belt and a catch mechanism 82 is provided for releasably holding each of the covers in its closed position as shown in FIGURES 1 of the drawings. The pivotal mounting of the covers to the bottom wall 16 of the housing allows these members to be moved to open positions shown in FIGURE 3 of the drawings where they are disposed below the transverse planes of the belt loading slots 56 and 57. A window-like opening 83 is formed in the cover 18 to provide the dictator with a visual indication as to whether a belt is loaded and being properly driven during dictation operations when the side covers are closed.

Considering now the operation of the portable dictating machine when it is desired to change a record belt, it will be assumed a belt is loaded in the machine and the side covers 18 and 19 are closed as shown in FIGURE 2 of the drawings. The dictator manipulates the catches 82 and the covers 18 and 19, support arms 69 and 76, and guide rolls 41 and 42 swing outwardly to the positions shown in FIGURE 3 of the drawings. The guide roll 40 is raised to its retracted position due to the interconnection between one of the support arms 69 and the pivoted roll carrier 61. At this time the record belt assumes its normal cylindrical shape and is outside of the housing with the exception of those intermediate portions thereof lying in the transverse planes of the slots 56 and 57. The record belt is very loosely received over the support arms 69 and 76 and the guide rolls 41 and 42. These latter members serve to support the flexible record belt in its normal cylindrical or tubular shape.

To remove the record belt, the dictator moves the belt endwise out through the slots 56 and 57. A different record belt is loaded into the portable dictating machine by inserting parallel intermediate side portions of the belt through the slots 56 and 57 while guiding the end loop portions over the guide rolls 41 and 42. The belt removal and loading operations are characterized by their extreme simplicity and the ease with which they are accomplished. The side edges of the snap-on cap 58 for the battery casing 54 and/or the edges of the end wall 12 and bottom wall 16 can be beveled as represented by reference numeral 85 to guide the side edges of the record belt into the slots 56 and 57 when the record belt is being loaded. Similarly, the top of the battery casing 54, the bottom of the drive roll 38, the roll carrier 61 and the guide rolls 39 and 40, and the bottom wall 16 are all formed to assist in changing a record belt.

To complete the belt loading operation, the dictator closes the side covers 18 and 19. This automatically moves the guide rolls 41 and 42 to the closed positions, the belt is wrapped about the lower surface of guide roll 38 and entrained in its generally double U-shaped path of travel, and the belt is properly tensioned. The inner surfaces of the side covers engage the outer side edges of the arms 69 and 76 so that the guide rolls 41 and 42 move in arcuate paths up into the interior of the housing. The design of the support arms 69 and 76, recesses 71 and 78 in the end walls 11 and 12 of the housing, and the inner surfaces of the side covers 18 and 19 is such that the guide rolls 41 and 42 are rigidly maintained in their retracted belt loaded position when the covers are closed and held by catch mechanisms 82. In essence, the walls of the recesses and the inner surfaces of the covers engage the support arms and prevent pivotal movement thereof in either direction.

Figure 5:
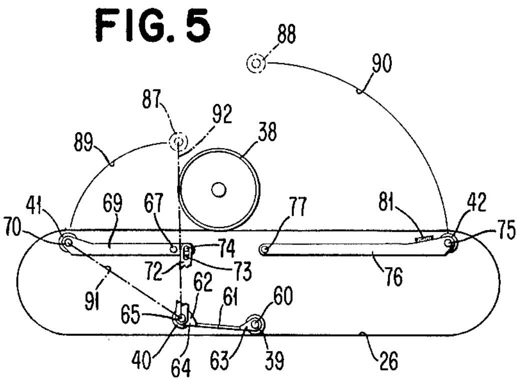
FIGURE 5 is a schematic end view of certain portions of the portable dictating machine which is useful in explaining the geometry and principles that facilitate changing the record belts.

The schematic diagram shown in FIGURE 5 of the drawings illustrates how the record belt 26 is automatically tensioned for movement in its path of travel when the side covers 18 and 19 are closed and the guide rolls 41 and 42 move to their retracted positions. In the record belt loading position, the record belt is very loosely received over the guide rolls 41 and 42. However, when these guide rolls 41 and 42 move to their retracted positions as represented by the broken lines 87 and 88, the belt has been drawn taut and is properly tensioned. The reason for this is that the straight line distances between the pairs of guide rolls 40, 41 and 39, 42 change appreciably as the guide rolls 41 and 42 move in their arcuate paths of travel as represented by the lines 89 and 90. For example, since the guide roll 41 is pivoted for movement about the pin 67, the distance (shown by line 91) between guide rolls 40 and 41 when the guide roll 41 is in the extended position is much less than the distance (shown by line 92) between these same guide rolls when guide roll 42 is in the retracted position. A similar analysis will show that the same condition exists with respect to the guide rolls 39 and 42.

When the side cover 18 is closed and the guide roll 41 is moved to its retracted position, the pin 74 carried by arm 69 moves in slot 73 in the lever 72 so that leaf spring 66 exerts a tensioning force on the record belt via roll carrier 61 and guide roll 40. Guide roll 40 is spring loaded to tension and to compensate for irregularities or changes in the circumference of the record belts due to normal manufacturing variations, temperature or humidity changes, etc. The resilient mounting of guide roll 40 also provides a means for dampening out any transient mechanical motions or vibrations imparted to the record belt by the drive roll 38. The drive roll 38 rotates in a counterclockwise direction so that any sudden movement of the drive roll 38 must be transmitted through the record belt over the guide roll 41, around guide roll 40, around guide roll 39, and over guide roll 42 to the point where the transducer 25 engages the record belt. In addition to the spring mounting of guide roll 40, the location of the transducer 25 at a point spaced almost the entire length of the record belt from the drive roll 38 helps to eliminate the effect of spurious mechanical signals.

It should now be apparent that the objects initially set forth have been accomplished. Of particular importance is the provision of a portable dictating machine having improved apparatus for guiding a record belt in a path of travel and which greatly facilitates loading and unloading of the belt. The record belt is easily slipped into the dictation machine in its normal cylindrical shape and then is automatically moved to a complicated path of travel and properly tensioned when the dictating machine is closed. The generally double U-shaped path of travel is especially advantageous since the transducer is positioned in nesting relation between the legs of the path and a minimum of space is required. The disclosed portable dictating machine is quite compact, having approximately the same overall size as a single standard record belt.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A portable dictating machine or the like for recording dictation on a flexible record belt having a normal generally cylindrical shape comprising:

a housing having a top wall, a bottom wall and a pair of spaced end walls;

the sides of said housing being generally open;

guiding means for guiding a record belt in a generally double U-shaped path of travel within the confines of said housing;

said double U-shaped path of travel having spaced end portions;

a transducer movably mounted in said housing in nesting relation in the space between said end portions of said path of travel for recording dictation on a record belt;

said guiding means comprising a drive roll mounted for rotation in said housing between said top wall and said bottom wall;

a pair of relatively stationary guide surfaces in said housing mounted adjacent said bottom wall;

a pair of slots in one of said end walls, one of said slots being disposed between said drive roll and said stationary guide surfaces and the other of said slots being disposed between said stationary guide surfaces and said bottom wall;

a pair of relatively movable guide surfaces;

means mounting each of said movable guide surfaces for movement from a retracted position within the confines of said housing to an extended loading position outwardly of said housing;

said retracted position being on the opposite side of said drive roll from said stationary guide surfaces and defining the extent of one of said end portions of said double U-shaped path of travel;

said extended position being outwardly of said housing and located between said one of said slots and said stationary guide surfaces; and a record belt being removable from and insertable into said housing through said pair of slots in a normal generally cylindrical shape when said movable guide surfaces are in the extended positions and being properly positioned about said drive roll and said guide surfaces in said generally double U-shaped path of travel when said movable guide surfaces are in the retracted positions.

2. Apparatus according to claim 1 further characterized by:

a pair of covers for said generally open sides of said housing;

said covers being pivotally mounted to said bottom wall; and means operative during closing movement of said covers to move said movable guide surfaces from said extended positions to said retracted positions.

3. Apparatus according to claim 1 further characterized by:

means for maintaining said movable guide surfaces in said retracted positions; and said means for maintaining comprising a pair of removable covers for said generally open sides of said housing and stop means on said end walls.

4. Apparatus according to claim 1 further characterized by:

means to cause relative movement between said transducer and a record belt;

said means to cause comprising a motor within the interior of said drive roll for driving said drive roll;

a lead screw extending between said end walls in generally parallel spaced relation with respect to said drive roll and having a selective driving connection with said transducer;

gear means drivingly interconnecting said drive roll and said lead screw; and a recess in one of said end walls of said housing nestingly receiving said gear means.

5. Apparatus according to claim 1 further characterized by:

said means mounting each of said movable guide surfaces comprises a pair of spaced support arms pivoted at one set of ends to said housing between said one of said slots and said stationary guide surfaces; and the movable guide surface associated with said support arms spanning the other set of ends of said support arms.

6. Apparatus according to claim 5 further characterized by:

a complaint member spanning said support arms intermediate said sets of ends thereof; and said complaint member engaging the inner surface of a record belt at a point adjacent said transducer when the associated movable guide surface is in the retracted position to loosely clamp the record belt between the transducer and said complaint member.

7. A portable dictating machine or the like for recording dictation on a flexible record belt having a normal generally cylindrical shape comprising:

a housing having a top wall, a bottom wall and a pair of spaced end walls;

at least one side of said housing being generally open;

guiding means for guiding a record belt in a complicated path of travel;

a transducer movably mounted in said housing in transducing relation with said record medium when the same is guided in said complicated path of travel;
said guiding means comprising a drive roll mounted for rotation in said housing between said top wall and said bottom wall;
a relatively stationary guide surface in said housing mounted adjacent said bottom wall;
a pair of slots in one of said end walls, one of said slots being disposed between said drive roll and said stationary guide surface and the other of said slots being disposed between said stationary guide surface and said bottom wall;
a relatively movable guide surface;
means mounting said movable guide surface for movement from a retracted position within the confines of said housing to an extended loading position outwardly of said housing;
said retracted position being on the opposite side of said drive roll from said stationary guide surface;
said extended position being outwardly of said housing and located between said one of said slots and said stationary guide surface; and
a record belt being removable from and insertable into said housing through said pair of slots when said movable guide surface is in said extended position and being properly positioned about said drive roll and said guide surfaces in said complicated path of travel when said movable guide surface is in said retracted position.

8. A portable dictating machine or the like for recording dictation on a flexible record medium comprising:
a housing having a top wall, a bottom wall and a pair of spaced end walls;
at least one side of said housing being generally open;
guiding means for guiding a record medium in a complicated path of travel;
said guiding means comprising a first stationary guide surface in said housing extending generally between said end walls;
a second relatively stationary guide surface in said housing extending generally between said end walls spaced from said first stationary guide surface;
a pair of openings in one of said end walls of said housing, one of said openings being disposed between said first and second stationary guide surfaces and the other of said openings being disposed on the opposite side of said second stationary guide surface;
a relatively movable guide surface;
means mounting said relatively movable guide surface for movement from an extended position outwardly of said housing located between said first and second stationary guide surfaces to a retracted position on the opposite side of said first stationary surface from said second stationary guide surface within the confines of said housing; and
a record medium being removable from and insertable into said housing through said pair of openings when said movable guide surface is in said extended position and properly positioned about said guide surfaces for movement in said complicated path of travel when said movable guide surface is in said retracted position.

9. A portable dictating machine or the like for recording dictation on a flexible record medium comprising:
a housing having a pair of spaced end walls;
at least one side of said housing being generally open;
guiding means for guiding a record medium in a complicated path of travel;
said guiding means comprising a first stationary guide surface in said housing extending generally between said end walls;
a second relatively stationary guide surface in said housing extending generally between said end walls spaced from said first stationary guide surface;
at least one opening in one of said end walls of said housing disposed between said first and second stationary guide surfaces;
a relatively movable guide surface;
means mounting said relatively movable guide surface for movement from an extended position outwardly of said housing to a retracted position within the confines of said housing; and
a record medium being removable from and insertable into said housing through said opening when said movable guide surface is in said extended position and properly positioned about said guide surfaces for movement in said complicated path of travel when said movable guide surface is in said retracted position.

10. Apparatus according to claim 9 further characterized by:
a cover for said generally open side of said housing; and
means operative during closing movement of said cover to move said movable guide surface from said extended position to said retracted position.

11. Apparatus according to claim 9 further characterized by:
said means mounting said movable guide surface comprises a pair of spaced support arms pivoted to said housing at one set of ends thereof between said opening and said stationary guide surface; and
said movable guide surface spanning the other set of ends of said support arms.

12. Apparatus according to claim 9 further characterized by:
one of said stationary guide surfaces being yieldingly mounted for tensioning a record medium when the latter is positioned in said complicated path of travel.

13. Apparatus according to claim 12 further characterized by:
means to move said yieldingly mounted guide surface to a retracted position out of tensioning relation with a record medium when said movable guide surface is moved to said exteded position.

14. A portable dictating machine or the like for recording dictation on a flexible record medium comprising:
a housing mounting guiding means for guiding a record medium in a complicated path of travel;
said guidiing means comprising a first guide surface;
means yieldably mounting said first guide surface within said housng for tensioning a record medium when the latter is in said complicated path of travel;
a second guide surface;
means mounting said second guide surface for movement from an extended position outwardly of said housing to a retracted position within the confines of said housing; and
means to move said first guide surface to a retracted position out of tensioning relation with a record medium when said movable guide surface is moved to said extended position.

15. A portable dictating machine or the like for recording dictation on a flexible record medium comprising:
a housing mounting guiding means for guiding a record medium in a complicated path of travel within said housing;
said guiding means comprising a pair of movable guide surfaces;
means mounting each of said movable guide surfaces for movement in an extended path of travel from a retracted position within the confines of said housing to an extended position outwardly of said housing;
a transducer mounted in said housing in transducing relation with the record medium when said movable guide surfaces are in the retracted positions; and means to effect relative movement between said transducer and the record medium when the latter is in said complicated path of travel.

16. A portable dictating machine or the like for recording dictation on a flexible record medium comprising:
a housing having a generally open interior;
guiding means for guiding a record medium in a complicated path of travel within said housing;
said guiding means comprising a stationary guide surface and a movable guide surface;
means mounting said movable guide surface for movement in an extended path of travel from a retracted operative record medium guiding position within the confines of said housing to an extended record medium loading position outwardly of the confines of said housing;
a transducer means mounted in said housing in transducing relation with a record medium when said movable guide surface is in said retracted operative position within the confines of said housing; and
means to effect relative movement between said transducer means and a record medium to record dictation when the latter is in said complicated path of travel and said movable guide surface is in said retracted operative position.

17. A portable dictating machine or the like for recording dictation on a flexible record belt having a normal generally cylindrical shape comprising:
a housing having a generally open interior;
means for supporting a record belt in said housing;
said means for supporting comprising at least one stationary guide surface and a movable guide surface;
said movable guide surface being movable from a first record belt loading position outside of said housing and loosely supporting a record belt in its normal generally cylindrical shape to a second operative belt guiding position completely within said housing causing the record belt to conform to a complicated path of travel;
the distance between said stationary guide surface and said first record belt loading position of said movable guide surface being greater than the distance between said stationary guide surface and said second operative belt guiding position of said movable guide surface;
a transducer mounted in said housing in transducing relation with a record belt when said movable guide surface is in said second operative belt guiding position; and
means to effect relative movement between said transducer and a record belt when the latter is properly positioned in said complicated path of travel with said movable guide surface in said second operative belt guiding position.

18. A portable dictating machine or the like for recording dictation on a flexible record medium comprising:
a housing having a top wall and a pair of spaced end walls;
guiding means for guiding a record medium in a complicated path of travel;
said guiding means comprising a drive roll mounted in said housing and extending between said end walls;

a plurality of guide surfaces in said housing;
a member extending in cantilever fashion from one of said end walls in generally parallel spaced relation with respect to drive roll to provide an opening in the other of said end walls;
a record medium being removable from and insertable into said housing through said opening;
a transducer mounted in said housing; and
means to effect relative movement between said transducer and a record medium when the latter is in said complicated path of travel.

19. Apparatus according to claim 18 further characterized by:
said guide roll being hollow;
a drive means received within the interior of said guide roll;
said member being hollow; and
a source of energy for said drive means being received within the interior of said member.

20. A portable dictating machine or the like for recording dictation on a flexible record medium having a normal generally cylindrical shape comprising:
a housing having a generally open interior;
means for supporting a record medium in said housing;
said means for supporting comprising at least one stationary guide surface and a movable guide surface;
said movable guide surface being movable from a first record medium loading position outside of said housing and loosely supporting a record medium in its normal generally cylindrical shape to a second operative record medium guiding position completely within said housing causing the record medium to conform to a complicated path of travel;
said first record medium loading position and said second operative record medium guiding position of said movable guide surface being disposed on opposite sides of said stationary guide surface to cause wrapping of a record medium about said stationary guide surface when said movable guide surface moves to said second position;
a transducer mounted in said housing in transducing relation with a record medium when said movable guide surface is in said second operative record medium guiding position; and
means to effect relative movement between said transducer and a record medium when the latter is properly positioned in said complicated path of travel with said movable guide surface in said second operative record medium guiding position.

References Cited by the Examiner

UNITED STATES PATENTS

| | | | |
|---|---|---|---|
| 2,702,710 | 2/1955 | Conrad | 274—20 X |
| 3,078,350 | 2/1963 | Lyon et al. | 274—4 X |
| 3,091,668 | 5/1963 | Trost | 274—20 X |
| 3,134,599 | 5/1964 | Roberts et al. | 274—11 X |

FOREIGN PATENTS

| | | |
|---|---|---|
| 933,297 | 9/1955 | Germany. |

NORTON ANSHER, *Primary Examiner.*

CLIFFORD B. PRICE, *Assistant Examiner.*